United States Patent [19]
Lister et al.

[11] Patent Number: 5,861,564
[45] Date of Patent: Jan. 19, 1999

[54] INSPECTION BENCH WITH PIVOTING ARM

[75] Inventors: Peter Frederick Lister, North Vancouver; Peter Klein, Langley, both of Canada

[73] Assignee: Forintek Canada Corp., Vancouver, Canada

[21] Appl. No.: 938,139

[22] Filed: Sep. 26, 1997

[51] Int. Cl.$^6$ ........................................ H04N 7/18
[52] U.S. Cl. .......................................... 73/865.8; 356/375
[58] Field of Search .............................. 73/865.8, 865.9; 356/372, 375

[56] References Cited

U.S. PATENT DOCUMENTS

| | | |
|---|---|---|
| 1,447,176 | 3/1923 | Henry . |
| 1,658,691 | 2/1928 | Shiria . |
| 2,185,010 | 9/1939 | Young . |
| 2,990,764 | 7/1961 | Wilson . |
| 3,318,009 | 5/1967 | Tishler et al. . |
| 3,976,382 | 8/1976 | Westby ................................ 356/120 |
| 4,027,315 | 5/1977 | Barney . |
| 4,363,545 | 12/1982 | Schaefer et al. . |
| 4,403,230 | 9/1983 | Gruner et al. . |
| 4,403,860 | 9/1983 | Pryor ................................... 356/375 |
| 4,449,085 | 5/1984 | Gomoll . |
| 4,483,218 | 11/1984 | Beck et al. . |
| 4,620,281 | 10/1986 | Thompson et al. . |
| 4,644,394 | 2/1987 | Reeves ................................ 356/398 |
| 4,786,220 | 11/1988 | Fiides et al. . |
| 4,803,871 | 2/1989 | Harada et al. ........................ 73/865.8 |
| 4,821,579 | 4/1989 | Gernhart et al. . |
| 4,845,763 | 7/1989 | Bandyopadhyay et al. . |
| 4,854,161 | 8/1989 | Drits . |
| 5,000,036 | 3/1991 | Yellowley et al. . |
| 5,059,905 | 10/1991 | Drits . |
| 5,150,623 | 9/1992 | Woods ................................ 73/865.8 |
| 5,193,405 | 3/1993 | Oomichi et al. ...................... 73/865.8 |
| 5,374,971 | 12/1994 | Clapp et al. . |
| 5,650,579 | 7/1997 | Hatley et al. ........................ 73/865.8 |

OTHER PUBLICATIONS

Lister, Peter: Improving Saw Tooth Grinding Accuracy Using a New Automatic Measuring Device; Conference Proceedings, with Technology Clinic and Show, Mar. 13–15, 1996, Portland, Oregon.

*Primary Examiner*—Max H. Noori
*Attorney, Agent, or Firm*—Christie, Parker & Hale, LLP

[57] ABSTRACT

Apparatus for inspection of a cutting tool by an examination device is provided. The examination tool is preferably a camera. The apparatus includes a base and a cutting tool mounting member on the base for attachment of a cutting tool to be inspected. The mounting member is adapted to position the cutting tool at a viewing location for the camera. There is a movable arm having a mounting location for receiving the camera. The movable arm is mounted to the base for rotation such that the camera moves in a first plane that includes the viewing location. The movable arm is also pivotable away from first plane to a second plane. An aperture through the base permits observation of the viewing location by the camera when the arm is pivoted to the second plane. The apparatus of the present invention permits fast, accurate and consistent measurement of the cutting surface geometry of a cutting tool. Preferably, the mounting location for the camera is movable along the arm and includes a positioning system to automatically adjust the position of the mounting location when the arm is pivoted from the first plane to the second plane to maintain the focus of the camera. By maintaining the focus of the camera between the first and second planes, the apparatus of the present invention permits rapid and accurate inspection of a cutting tool surface using software controlled inspection systems.

9 Claims, 4 Drawing Sheets

INSPECTION BENCH WITH PIVOTING ARM

FIELD OF THE INVENTION

This invention relates to apparatus for inspection of cutting tools and more particularly to inspection of saw blades by video camera.

BACKGROUND OF THE INVENTION

Many modern cutting tools, particularly saw blades with their many cutting teeth, require very accurate tooth preparation in order to maintain sawing accuracy that is within pre-determined limits. Sharp, accurately ground saw teeth are essential for efficient, safe and reliable operation. Even small inaccuracies in tooth geometry can increase cutting forces resulting in large sawing variation. For example, studies by applicant have shown that even a one degree error in the side clearance angle can cause a fourfold increase in sawing variation. Therefore, to achieve the best possible sawing performance, it is essential that the tooth grinding process is monitored to ensure that teeth are correctly sharpened.

Monitoring the quality of saw grinding involves both visual inspection and measurement of important teeth geometry. Inspection can help to uncover general grinding problems such as incompletely sharpened teeth, large burrs, chipped tooth corners and irregularly shaped cutting edges. These types of problems are often related to the procedures followed during grinding. Measurements, on the other hand, are also required to ensure that the desired saw tooth geometry is being achieved. For example, kerf width is almost always measured to ensure that it remains between some specified maximum and minimum values. However, more extensive measurements are also important because they can uncover grinder set-up problems which can cause systematic tooth geometry errors. These types of errors can cause tapered lumber and double arbor mismatch.

Inspecting and measuring saw teeth can be very difficult in practice because of the small size of the teeth and because of the complex tooth shape that needs to be measured. With a typical carbide tooth saw, there are a total of 11 different measurements to be made to characterise the geometry of each individual tooth. These are: kerf width, left and right side clearances, top and face angles, left and right radial clearance angles, left and right tangential clearance angles, hook angle and back clearance angle. Some of these measurements such as kerf and side clearances for example are easily measured with simple hand tools like micrometers and side clearance gauges. Others, however, are more difficult to measure accurately. In particular, angles of the face, top and sides of the teeth are very difficult to measure accurately using conventional tools.

As a result, special tools have been developed that rely on small magnifying lenses and calibrated scales to help measure some of the tooth angles. Unfortunately, these tools are rather difficult to use and measurement accuracy depends to a large extent on the skill of the user.

Applicant is also aware of the following patents that deal in general with apparatus and methods for inspection of surfaces:

U.S. Pat. No. 4,821,579 to Gernhart et al
U.S. Pat. No. 3,318,009 to Tisher et al
U.S. Pat. No. 2,185,010 to Young
U.S. Pat. No. 1,447,176 to Henry
U.S. Pat. No. 5,374,971 to Clapp et al
U.S. Pat. No. 4,363,545 to Schaefer et al
U.S. Pat. No. 4,403,230 to Gruner et al
U.S. Pat. No. 2,990,764 to Wilder
U.S. Pat. No. 4,027,315 to Barney
U.S. Pat. No. 4,483,218 to Beck et al
U.S. Pat. No. 1,658,691 to Shiria Several of these patents deal with inspection equipment for razor blades where it is sufficient to view the surface of interest from a single position to determine if the blade meets quality standards. As such, this equipment is not particularly useful with saw teeth where accurate top, face and side views are necessary to determine tooth geometry.

One of the most promising methods for inspecting and measuring saw tooth geometry relies on a video camera to provide a magnified image of individual saw teeth. The video camera is held by a mount which can move the camera to view the top, face and side views of individual teeth. The magnified image of the tooth is displayed on the a monitor along with movable reference lines. These lines can be adjusted so they are aligned with the tooth and are useful for visually checking the squareness of the top and face of a tooth and for comparing left and right side clearances angles.

Video systems of this type have been available for several years and are now becoming more popular. The ease and speed of use makes these systems suitable for quality control in the sharpening room. They are useful because they greatly aid the tooth inspection process and can help to identify many common grinding problems. Unfortunately, the measurement capability is very limited so assessing tool quality is essentially subjective. This makes it difficult to set standards for quality control purposes.

Applicant has developed a video inspection system that retains the useful quality control aspects of previous video systems and also provides fast and accurate tooth measurements. The system includes an inspection bench for mounting of cutting tool to be inspected, a high resolution video camera and lens, a fibre optic lighting system and a computer and monitor. The video camera provides magnified images of the top, face and side views of individual teeth. The images are captured by the computer system and displayed on the monitor. Sophisticated computer software is used to analyze the tooth image and provide visual inspection and automatic measurement capabilities.

SUMMARY OF THE INVENTION

An important component of applicant's video inspection system is the inspection bench which is the subject of the present application. The inspection bench has been designed to permit quick and accurate movement of the camera to various locations about the saw tooth under inspection to collect appropriate images for quality control and geometry measurement purposes. The inspection bench of the present invention permits movement of a camera holding arm to capture top and face images in a first plane and a side image in a second plane.

The inspection bench of the present invention is not limited to use with a camera or with saw teeth. It can be used to inspect most cutting tools having a sharpenable edge and it can be used with other measuring tools that are employed to determine the geometry of the cutting surface under inspection by taking measurements from several different positions.

Accordingly, the present invention provides apparatus for inspection of a cutting tool by an examination device comprising:
 a base;
 a cutting tool mounting member on the base for attachment of a cutting tool to be inspected, the mounting member being adapted to position the cutting tool at a viewing location for the examination device;

a movable arm having a mounting location for receiving the examination device, the movable arm being mounted to the base for rotation such that the examination device moves in a first plane that includes the viewing location, and the movable arm being adapted for pivotal movement away from first plane to a second plane; and an aperture through the base to permit observation of the viewing location by the examination device when the arm is pivoted to the second plane.

The apparatus of the present invention permits fast, accurate and consistent measurement of the cutting surface geometry of a cutting tool.

The inspection bench is particularly useful when used with a camera in conjunction with a video inspection system as described above. Preferably, the mounting location that holds a camera is movable along the arm and includes a positioning system to automatically adjust the position of the mounting location when the arm is pivoted from the first plane to the second plane to maintain the focus of the camera. By maintaining the focus of the camera between the first and second planes, the apparatus of the present invention permits rapid and accurate inspection of a cutting tool surface using measurement software.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Referring to the Figures, there is shown an inspection bench 1 according to a preferred embodiment of the present invention. By way of example, the following description details how the inspection bench is used for inspecting the individual saw teeth 8 of a circular saw blade 4. It will be understood that the inspection bench is not limited to this activity. The inspection bench of the present invention can be used to inspect the geometry of any cutting surface that can be mounted for viewing. In addition, it will be apparent to those skilled in the art that an alternative examination device requiring physical alignment with the cutting surface can be substituted for the camera set out in the following description. Examples of alternative examination devices includes a contacting probe stylus or a non-contacting laser based displacement probe.

Figure 1A:
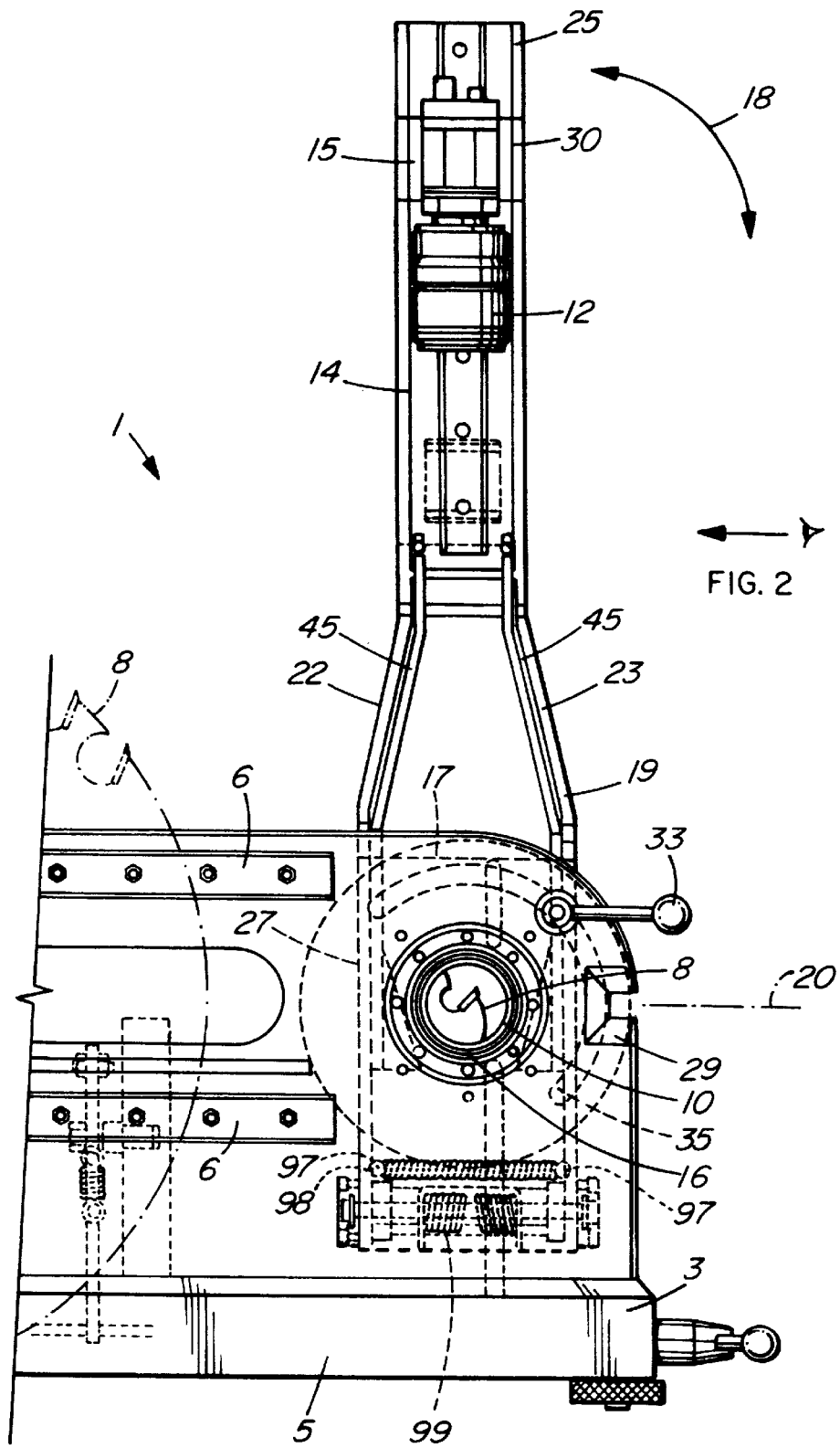
FIGS. 1A and 1B are a front elevation view of an inspection bench according to a preferred embodiment of the present invention.
Figure 1B:
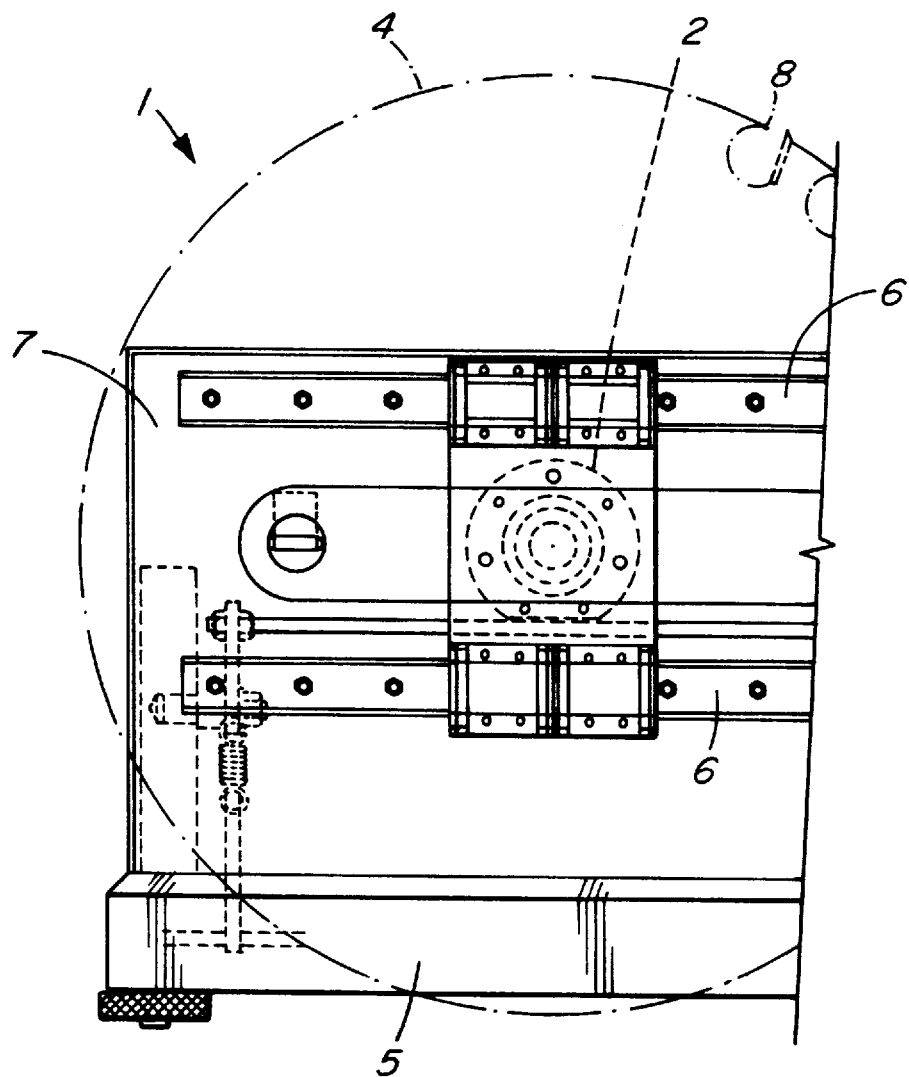

In FIGS. 1A and 1B, inspection bench 1 comprises a base 3 having a first generally horizontal portion 5 and a second generally vertical portion 7. Attached to vertical portion 7 is a cutting tool mounting member comprising a bracket 2. In this case, bracket 2 is designed to receive a circular saw blade 4 shown in dotted lines. Bracket 2 is slidable along rails 6 to position an individual saw tooth 8 for inspection at viewing location 10. Bracket 2 includes a rotatable bearing to allow the attached saw blade 4 to be rotated so that each tooth can be inspected in turn at viewing location 10.

A movable arm 14 is mounted to vertical portion 7 of base 3. Arm 14 includes a mounting location 15 for receiving a camera 12 that is focused on the tooth at viewing location 10. Preferably, camera 12 is a high precision camera with a very shallow field of focus. Mounting location 15 is preferably movable along arm 14. This is achieved by providing a plate that is slidably received on rails 30.

Arm 14 is rotatable about a first joint comprising a sleeve bearing 16 rotatably joining generally vertical portion 7 and arm 14. Arm 14 is assembled from a lower bearing block 17 that receives sleeve bearing 16 and an elongate upper portion 19 that is pivotally connected to the lower end of bearing block 17 at a second joint 28. As best shown in FIG. 1, elongate arm portion 19 has an inverted Y configuration with the arms 22 and 23 of the Y extending downwardly on either side of bearing block 17 for pivotal connection of each arm at joint 28 on opposite sides of the bearing block. The upper tail 25 of the Y includes mounting location 15 that supports camera 12.

Figure 2:
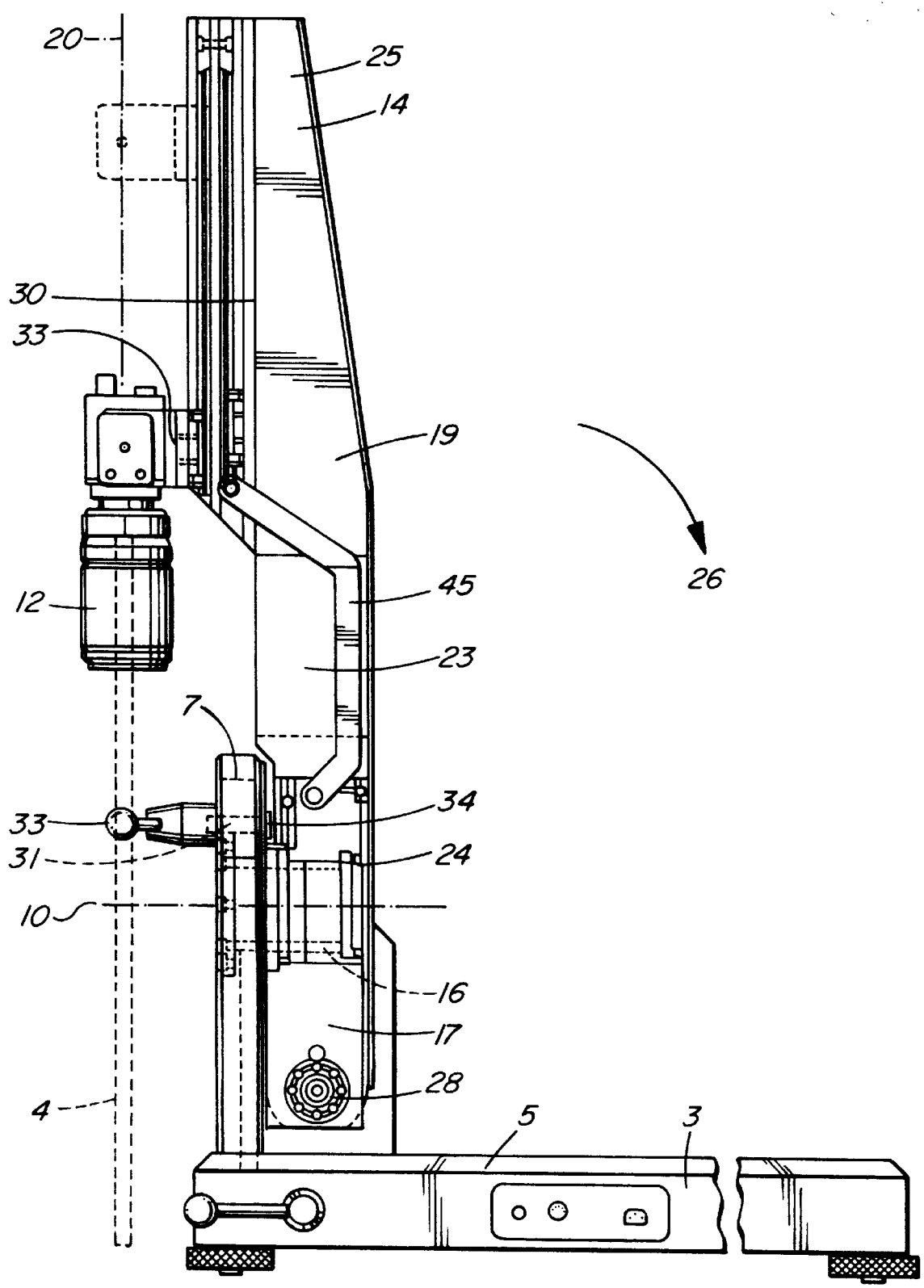
FIG. 2 is a side view of the bench of FIG. 1 with the arm positioned for movement in the first plane.

Referring to FIGS. 1A, 1B and 2, rotation of arm 14 about sleeve bearing 16 in the direction indicated by arrow 18 (FIG. 1) acts to move camera 12 in a first plane 20 (FIG. 2) that includes viewing location 10. In this manner, once camera 12 is focused on a tooth 8 at viewing location 10, the camera will tend to remain focused on the tooth as it is moved in first plane 20. This permits the operator of the apparatus to obtain a face view image of the tooth at the position indicated in FIG. 1 and then rotate the arm through 90 degrees to obtain a top view image.

As best shown in FIG. 1A, a disc 27 (shown in dotted lines) is attached to bearing block 17 in order to lock the rotation of arm 14 about sleeve bearing 16. A clamping handle 33 is provided that includes a shaft 31 that extends through portion 7. A curved slot 35 is formed in disc 27 and shaft 31 is received in the slot. Shaft 31 terminates in a flange 34 that is engagable against the rear surface of disc 27 when clamping handle 33 is applied. Shaft 31 is free to move in slot 35 to permit rotation of bearing block 17 and arm 14, however, when clamping handle is tightened, shaft 31 and flange 34 act to compress disc 27 against vertical base portion 7 to sleeve bearing lock arm 14 at a particular position.

Figure 3:
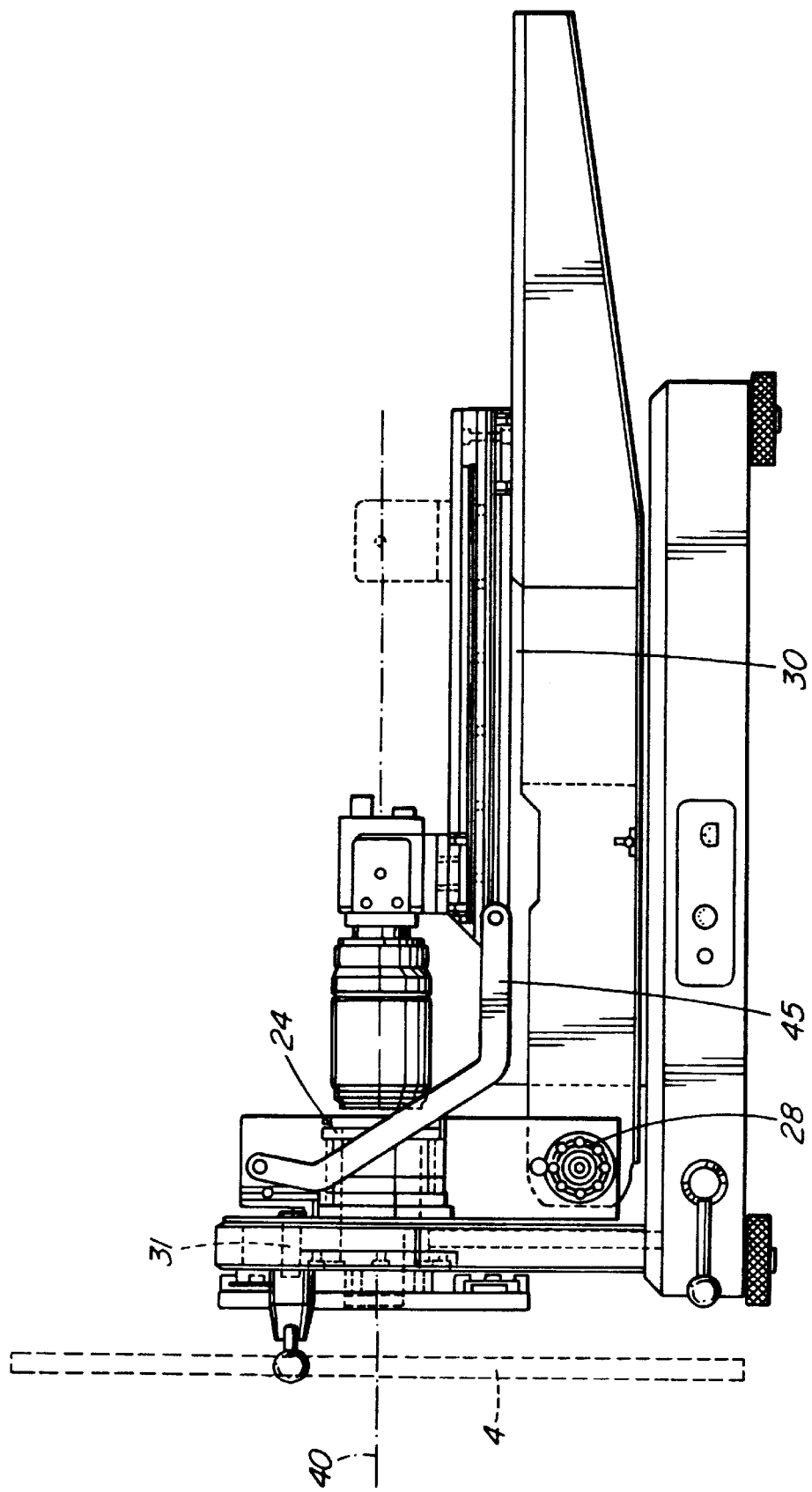
FIG. 3 is a further side view showing the arm pivoted away from the first plane to the second plane.

With reference to FIGS. 2 and 3, arm 14 is pivotable about joint 28 as indicated by arrow 26 to move camera 12 away from first plane 20 to a second plane 40 generally perpendicular to the first plane. By pivoting camera 12 into second plane 40, it is possible to obtain a side view image of the tooth 8 positioned in viewing location 10. This side view image is obtained by observing viewing location 10 through aperture 24. Aperture 24 is formed from co-axial passages in bearing block 17 and the vertical portion 7 of base 3 and the open central region of sleeve bearing 16 that align to define an observation window for camera 12 when the arm is pivoted to the second plane.

As best shown in FIG. 2, elongate portion 19 is urged by default into the vertical position with respect to bearing block 17 by a biasing spring 99 contained in pivot joint 28. In addition, as shown in FIG. 1, spring loaded detent balls 97 engage in retaining recesses 98 formed in Y arms 22 and 23 to further hold elongate portion 19 in the vertical position. The force of biasing spring 99 and detent balls 97 must be overcome to pivot elongate portion 19 to the second plane. When arm portion 19 is pivoted to the position shown in FIG. 3, the weight of the arm is sufficient to overcome the force of spring 99 and arm portion 19 rests on base 3.

An important feature of the inspection bench of the present invention is the provision of a positioning system adapted to automatically adjust the position of the mounting location 15 when arm 14 is pivoted from first plane 20 to second plane 40 to maintain the focus of camera 12. In the illustrated embodiment, this positioning system comprises a pair of linkages 45 pivotally connecting bearing block 17 and mounting location 15. When arm 14 is pivoted about joint 28, the linkages are fixed at bearing block 17 for pivotal movement and act to displace camera mounting location 15 by sliding of the mounting plate along rails 30. Linkages 45 are positioned and dimensioned so that the displacement of camera 12 on rails 30 is sufficient to maintain the focus of the camera at viewing location 10 as the camera is moved between the first and second planes. The advantages of such an arrangement are readily apparent. It is only necessary to focus the camera in one of the first or second planes and the camera will automatically remain in focus when the arm is moved to the other plane thereby saving the time that would normally be necessary to focus the camera when moving between planes.

Although the present invention has been described in some detail by way of example for purposes of clarity and understanding, it will be apparent that certain changes and modifications may be practised within the scope of the appended claims.

I claim:

1. Apparatus for inspection of a cutting tool by an examination device comprising:

a base;

a cutting tool mounting member on the base for attachment of a cutting tool to be inspected, the mounting member being adapted to position the cutting tool at a viewing location for the examination device;

a movable arm having a mounting location for receiving the examination device at an inspection distance from the viewing location, the movable arm being mounted to the base by a rotary joint to permit rotation of the arm such that the examination device is movable in a first plane that includes the viewing location, and the movable arm being mounted to the base by a second joint to permit pivotal movement out of the first plane to a second plane;

the rotary joint having an open central region and base being formed with a passage therethrough that co-operate to define an aperture to permit examination of the viewing location by the examination device when the arm is pivoted to the second plane; and a positioning system to automatically adjust the position of the mounting location on movement of the movable arm to the second plane, such that the inspection distance between the viewing location and the mounting location is maintained when the arm is positioned in the second plane.

2. Apparatus as claimed in claim 1 in which the examination device is a camera.

3. Apparatus as claimed in claim 1 in which the examination device is a measuring tool.

4. Apparatus as claimed in claim 2 in which the movable arm comprises:

a bearing block rotatably connected to the base by the rotary joint to allow rotation in the first plane; and an elongate portion pivotally connected to the bearing block by the second joint, the elongate portion including the mounting location.

5. Apparatus as claimed in claim 4 including a biasing spring associated with the second joint to urge the elongate portion into a default position such that the elongate portion and the bearing block rotate as a unit about the first joint, whereby overcoming the force of the biasing spring permits independent rotation of the elongate portion about the second joint to the second plane.

6. Apparatus as claimed in claim 4 in which the positioning system includes a least one linkage connecting the bearing block and the mounting location, the linkage acting to displace the mounting location along the elongate portion when the elongate portion is pivoted to the first and second planes such that the camera remains focused on the viewing location.

7. Apparatus as claimed in claim 1 in which the mounting location comprises a plate that is slidably mounted on rails.

8. Apparatus as claimed in claim 1 in which the rotary joint includes a locking clamp to permit locking of the movable arm in a given position.

9. Apparatus as claimed in claim 1 in which the cutting tool mounting member is attached to the base for slidable movement.

* * * * *